(12) United States Patent
Trent et al.

(10) Patent No.: US 10,371,570 B2
(45) Date of Patent: Aug. 6, 2019

(54) BURNOUT PROTECTION FOR OPTICAL SENSORS

(71) Applicant: RAYTHEON COMPANY, Waltham, MA (US)

(72) Inventors: Catherine Trent, Allen, TX (US); Gary A. Frazier, Garland, TX (US)

(73) Assignee: RAYTHEON COMPANY, Waltham, MA (US)

( * ) Notice: Subject to any disclaimer, the term of this patent is extended or adjusted under 35 U.S.C. 154(b) by 183 days.

(21) Appl. No.: 15/420,438

(22) Filed: Jan. 31, 2017

(65) Prior Publication Data
US 2018/0216992 A1 Aug. 2, 2018

(51) Int. Cl.
| | |
|---|---|
| *G01J 1/04* | (2006.01) |
| *G01J 1/02* | (2006.01) |
| *G02F 1/015* | (2006.01) |
| *G01J 1/42* | (2006.01) |
| *G01J 1/22* | (2006.01) |
| *G02B 1/00* | (2006.01) |
| *G02F 1/21* | (2006.01) |
| *G02B 5/28* | (2006.01) |

(52) U.S. Cl.
CPC .......... *G01J 1/0492* (2013.01); *G01J 1/0238* (2013.01); *G01J 1/0448* (2013.01); *G01J 1/22* (2013.01); *G01J 1/4257* (2013.01); *G02B 1/005* (2013.01); *G02B 5/281* (2013.01); *G02F 1/015* (2013.01); *G02F 1/218* (2013.01); *G01J 2001/0285* (2013.01); *G02F 2203/055* (2013.01)

(58) Field of Classification Search
CPC ....... G01J 1/0433; G01J 1/0488; G01J 1/0492
USPC .................. 250/216, 226; 359/359, 360, 891
See application file for complete search history.

(56) References Cited

U.S. PATENT DOCUMENTS

| | | | | |
|---|---|---|---|---|
| 3,699,347 | A | * | 10/1972 | Buchan ..................... G02F 1/21 250/214 LA |
| 4,724,311 | A | * | 2/1988 | Mechlenburg ...... G02F 1/13318 250/201.1 |
| 4,947,223 | A | | 8/1990 | Biefeld et al. |
| 5,027,178 | A | | 6/1991 | Svilans |
| 6,785,032 | B1 | | 8/2004 | Le Mere |
| 8,754,658 | B1 | | 6/2014 | Miller et al. |
| 2014/0239157 | A1 | | 8/2014 | Burgess et al. |

OTHER PUBLICATIONS

Bennett et al.; "Carrier-Induced Change in Refractive Index of InP, GaAs, and InGaAsP", IEEE Journal of Quantum Electronics, vol. 26, No. 1, Jan. 1990; pp. 113-122.
(Continued)

*Primary Examiner* — Kevin K Pyo
(74) *Attorney, Agent, or Firm* — Cantor Colburn LLP

(57) ABSTRACT

A method and apparatus for protecting an optical sensor is disclosed. A fixed filter having a fixed passband for light transmission is placed in front of the optical sensor. A programmable filter having a variable passband for light transmission is placed in front of the fixed filter. A controllable voltage source controls a voltage at the programmable filter that shifts the passband of the programmable filter from a first state in which the passband of the programmable filter is substantially the same as the passband of the fixed filter and a second state in which the passband of the programmable filter is different than the passband of the fixed filter.

20 Claims, 9 Drawing Sheets

(56) References Cited

OTHER PUBLICATIONS

Mehdi et al.; "Novel Use of Resonant Tunneling Structures for Optical and IR Modulators", Superlattices and Microstructures, vol. 5, No. 3, 1989, pp. 443-449.
PCT Invitation to Pay Additional Fees and, Where Applicable, Protect Fee; International Application No. PCT/US2018/015213; filed Jan. 25, 2018; dated May 18, 2018; pp. 1-15.

* cited by examiner

BURNOUT PROTECTION FOR OPTICAL SENSORS

BACKGROUND

The present disclosure relates to optical sensor technology and, in particular, to an apparatus and method for protecting optical sensors from burnout from incident high-intensity light.

Optical sensors can be damaged when subjected to high-intensity light levels, such as occurs during situations of sunlight, laser jammers, glint, etc. Refresh rates of certain optical sensors may be upwards of 10,000 frames per second. To prevent burnout from highly intense illumination, certain detectors need to react to light levels within a time frame less than about 1 microsecond.

SUMMARY

According to one embodiment, an apparatus for protecting an optical sensor includes: a fixed filter having a fixed passband for light transmission; a programmable filter having a variable passband for light transmission; and a controllable voltage source that shifts the passband of the programmable filter from a first state in which the passband of the programmable filter is substantially the same as the passband of the fixed filter and a second state in which the passband of the programmable filter is different than the passband of the fixed filter.

According to another embodiment, a method of protecting an optical sensor includes: placing a fixed filter having a fixed passband for light transmission in front of the optical sensor; placing a programmable filter having a variable passband for light transmission in front of the fixed filter; and controlling a voltage at the programmable filter to shift the variable passband of the programmable filter with respect to the fixed passband.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
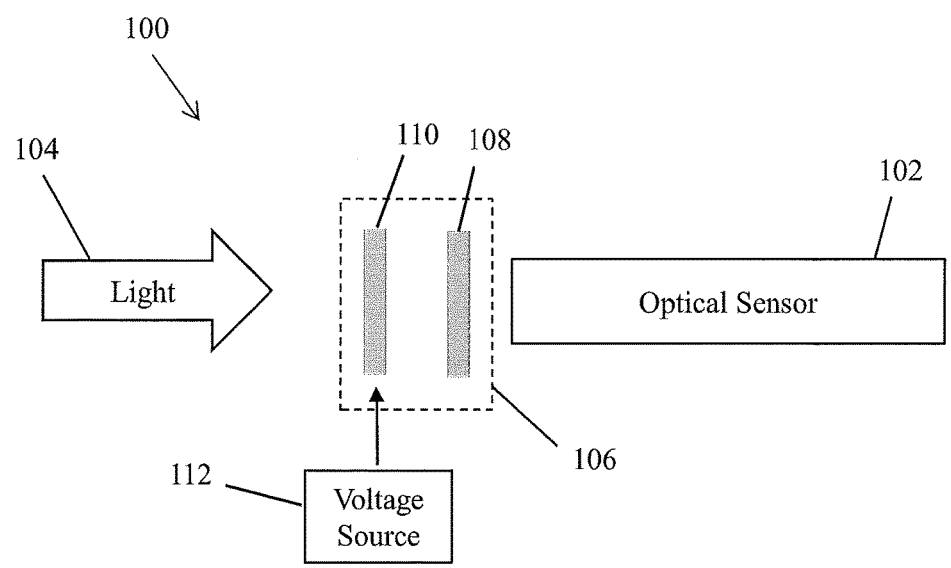
FIG. 1 shows a sensor system that includes a sensor and a shutter that protects the sensor from high-intensity light in one embodiment.

FIG. 1 shows a sensor system 100 that includes a sensor 102 and a shutter 106 that protects the sensor 102 from high-intensity light in one embodiment. The optical sensor 102 receives light 104, which can be light from a narrowband light source, such as a laser, or light resulting from an interaction of the narrowband light with a test object. Shutter 106 is disposed in front of an aperture of the sensor 102 so that light 104 passes through shutter 106 in order to be detected at optical sensor 102. Shutter 106 can be switched between an ON state and an OFF state in which either light passes through the shutter 206 and into the optical sensor 102 (the ON state) or light is blocked from passing through the shutter 206 (the OFF state). The ON state of shutter 106 may be considered to be the light transmitting state and the OFF state may be considered to be the light blocking state.

Shutter 106 includes a fixed filter 108 and a programmable filter 110 (or "tunable filter"). Light 104 passes through both the programmable filter 110 and the fixed filter 108 in order to pass through the shutter 106. The fixed filter 108 is characterized by a passband wavelength indicating a range of wavelengths that are allowed to pass through the fixed filter 108. The passband wavelength of the fixed filter 108 is centered on a central wavelength of the incoming light 104. In an exemplary embodiment, the passband wavelength is centered on 1.55 μm (1550 nanometers), although the central wavelength can be any wavelength of the optical spectrum including ultraviolet light, etc., depending on the wavelength of the light source. In various embodiments, the bandwidth of the incoming light is about 2 nanometers (nm). The bandwidth of the fixed filter 108 can be substantially the same as the bandwidth of incoming light 104. Therefore in various embodiments, the bandwidth of the fixed filter 108 is about 2 nm.

The programmable filter 110 has a variable passband wavelength and a narrow bandwidth on an order of the bandwidth of the fixed filter 108, e.g., about 2 nm. The programmable filter 110 is electrically coupled to a voltage source 112 that selectively applies a voltage bias to the programmable filter 110. The passband of the programmable filter 110 is shifted by applying the voltage bias. When no voltage is applied, the passband of the programmable filter 110 is substantially the same as the passband of the fixed filter 108. When a voltage bias is applied, the passband of the programmable filter 110 shifts away from the passband of the fixed filter 108 as discussed below with respect to FIG. 2.

Figure 2:
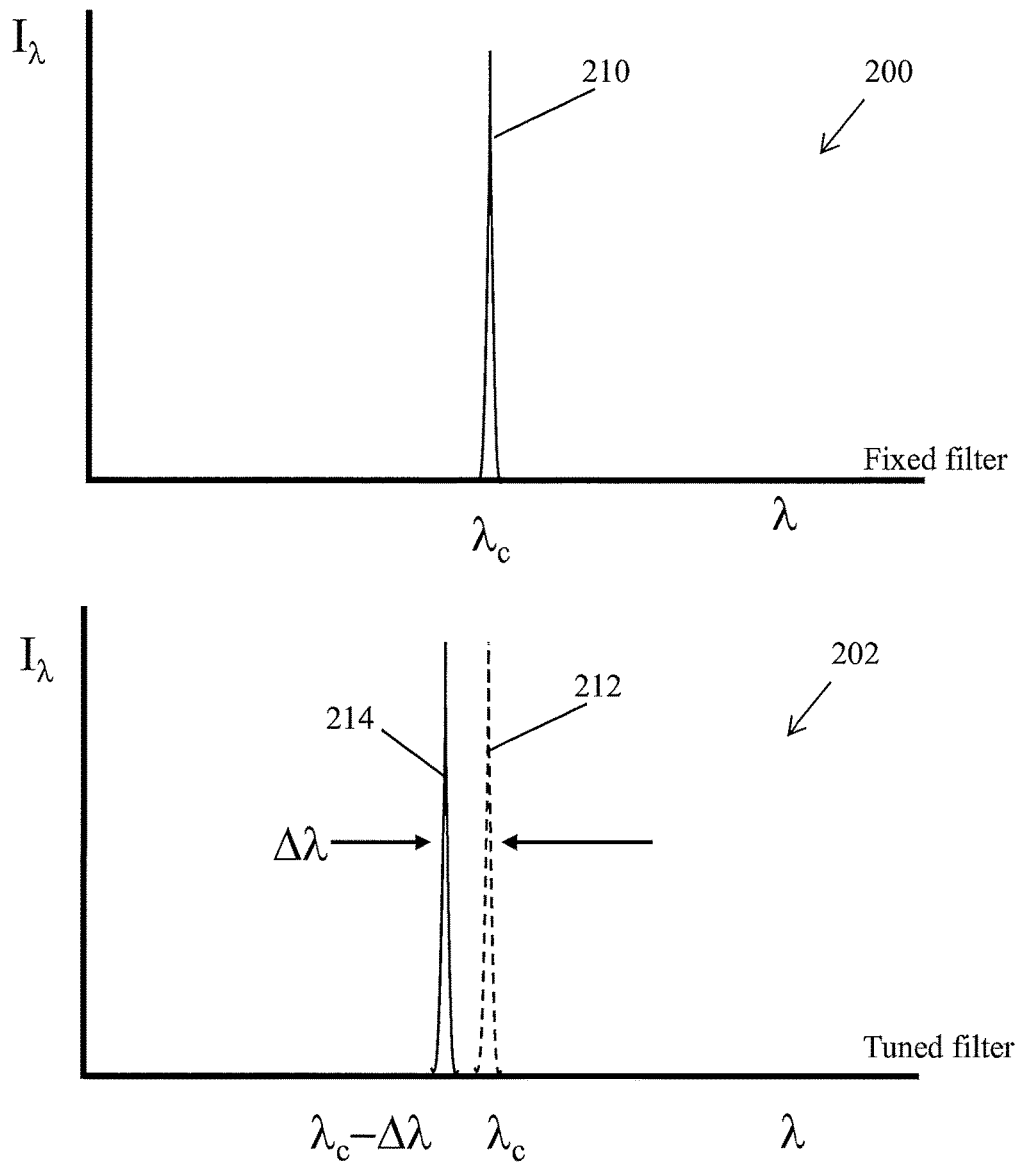
FIG. 2 shows passband spectra of a programmable filter and fixed filter of the shutter.

FIG. 2 shows passband spectra of the programmable filter 110 and the fixed filter 108. Spectrum 200 is a passband spectrum of the fixed filter 108. Intensity is shown along the y-axis and wavelength is shown along the x-axis. A transmission line 210 for the fixed filter 108 occurs at a passband wavelength, labelled $\lambda_c$, of the fixed filter 108. The bandwidth of the fixed filter 108 at $\lambda_c$ is about 2 nm. The passband wavelength is selected to be substantially the same as the wavelength of the light source or of the incoming light 104.

Spectrum 202 is a passband spectrum of the programmable filter 110 under various voltage bias conditions. Transmission line 212 indicates a passband wavelength for when no voltage bias is being applied to the programmable filter 110. Transmission line 212 occurs at passband $\lambda_c$ which is the same as the passband wavelength of the fixed filter 108. When a voltage bias is applied, transmission line 214 is shifted away from the passband $\lambda_c$ by a wavelength shift designated as $\Delta\lambda$. The direction of the wavelength shift depends on the sign of the voltage bias. The wavelength shift $\Delta\lambda$ can be as much as 10 nm in some embodiments. Therefore, a voltage bias can be applied to the programmable filter 110 such that the passband of the programmable filter 110 does not overlap any part of the passband of the fixed filter 108.

When no voltage bias is applied to the programmable filter 110, the passband of the programmable filter 110 is the same as the passband of the fixed filter 108 and light 104 is allowed to pass through the shutter 106 to be received at the optical sensor 102. When a voltage bias is applied to the programmable filter 110, the passband of the programmable filter 110 is shifted away from the passband of the fixed filter 108 and the light 104 is prevented from passing through the shutter 106 and entering the optical sensor 102. Thus, the voltage source 112 provides a voltage bias to control whether the shutter is in an "ON" state (with same passbands) or in an "OFF" state (with passbands shifted away from each other).

Figure 3:
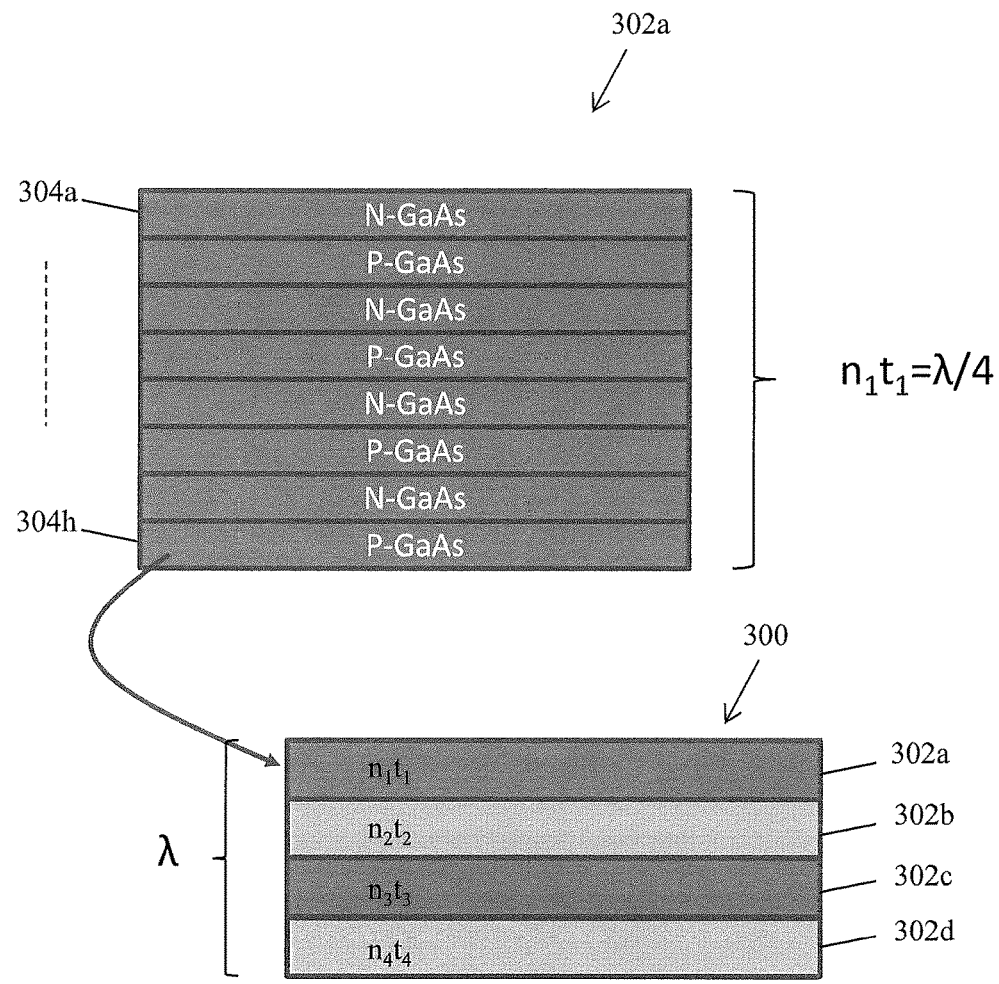
FIG. 3 shows a structure of a programmable filter in one embodiment.

FIG. 3 shows a structure of a programmable filter 300 in one embodiment. The programmable filter 300 is an interference filter that includes four quarter wavelength stacks (302a, 302b, 302c, 302d) layered on top of one another. The thickness of the programmable filter 300 is one optical wavelength of the incident light 104 when no voltage bias is applied, thereby allowing the incident light 104 to pass through the programmable filter 300, while light at other wavelengths are prevented from passing through.

Each quarter wavelength stack (302a, 302b, 302c, 302d) is therefore a quarter of an optical wavelength of the incident light 104, when no voltage bias is applied. The optical wavelength $\lambda$ is related to the product of the thickness t of the quarter-wave stack and the index of refraction n of the quarter-wave stack. Thus, for each quarter wavelength stack, $$\lambda/4 = nt \qquad \text{Eq. (1)}$$

Each quarter wavelength stack (302a, 302b, 302c, 302d) includes alternating layers of n-type and p-type materials. A blown up view of quarter wavelength stack 302a is shown for illustrative purposes. The quarter wavelength stack 302a includes multiple alternating layers (304a, . . . , 304h) of n-type Gallium Arsenide (GaAs) and p-type GaAs materials. The average index of refraction ($n_1$) for quarter-wavelength stack 302a is a result of its material composition. The average index of refraction $n_1$ is a function of an applied voltage bias and can thus be varied using a bias voltage. From Eq. (1) it is apparent that changing the index of refraction $n_1$ affects the passband wavelength for the stack.

Quarter wavelength stack 302b has the same structure as quarter wavelength stack 302a but is made of a material that is different in terms of its optical index of refraction from the material of quarter wavelength stack 302a. A difference in index of refraction between the material in stacks 302a relative to the material in stack 302b is required so that the index of refraction discontinuities at the interface between layers will produce multiple reflections and transmission of light which combine with the reflected and transmitted light from other interfaces to produce constructive or destructive optical interference. In various embodiments, quarter wavelength stack 302b includes multiple alternating layers of n-type and p-type Indium Gallium Arsenide (InGaAs) or multiple alternating layers of n-type and p-type Aluminum Gallium Arsenide (AlGaAs). As a result, the index of refraction $n_2$ of quarter wavelength stack 302b is different than the index of refraction $n_1$ of quarter wavelength stack 302a. In various embodiments, quarter wavelength stack 302c is made of the same material as quarter wavelength stack 302a, and quarter wavelength stack 302d is made of the same material as quarter wavelength stack 302b. Applying a voltage bias to the filter 300 shifts the index of refraction of the quarter wavelength stacks (302a, 302b, 302c, 302d), thereby shifting the passband wavelength of the programmable filter 300. Use of a shutter that includes two filters can reject off-axis light by selecting filters with different same passbands of off-axis light.

For broadband light sources, a large voltage bias is applied to the interference filter in order to close the shutter 106. Since absorption signal loss is related to the magnitude of the voltage bias, an appreciable absorption signal loss may be experienced at shutter 106 for broadband light sources. However, when the light 104 is a narrowband light, such as from a laser, only a small voltage bias is needed to provide a wavelength shift that switches the shutter between the ON and OFF states. Since a small amount of voltage bias is need to activate the shutter, virtually no signal loss occurs for narrowband light sources. Since the shutter 106 also forms an electrical capacitor, a smaller required change in applied voltage requires a proportionately smaller amount of electrical charge to be transferred to, or removed from, the shutter. For the same electrical drive circuitry smaller amounts of charge require less time to be transferred to the shutter than larger amounts of charge. Therefore the opening or closing shutter 106 can be achieved at higher speeds as the required voltage change is reduced.

Figure 4:
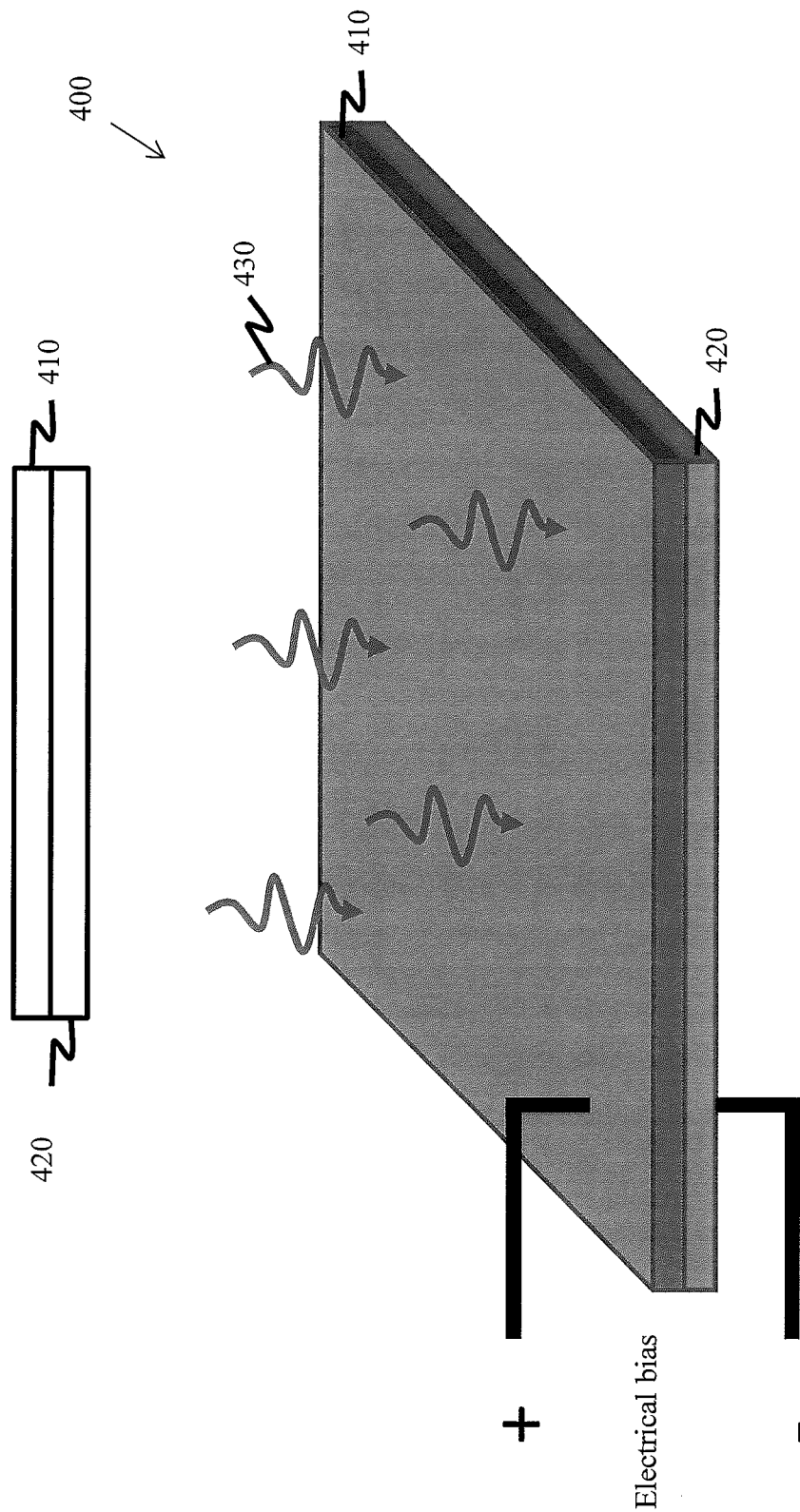
FIG. 4 shows a programmable filter in the form of a bilayer composed of two semiconductor layers.

FIG. 4 illustrates a programmable filter 110 in the form of a bilayer 400 composed of two semiconductor layers 410 and 420. A perspective view and a side view are shown. Light 430 illuminate the bilayer 400. Optical interference due to multiple reflections of light 430 internal to bilayer 400 alters the passband wavelength of the bilayer 400. The degree to which the passband wavelength can be altered is a function of the optical properties of the semiconductor layers 410 and 420. In one embodiment, layer 410 is composed of n-type $Al_xGa_{1-x}As$ (with x=0.0) semiconductor material and layer 420 is composed of p-type $Al_xGa_{1-x}As$ (with x=0.3) semiconductor material. A voltage applied across bilayer 400 changes the width of the depletion region at the junction of the semiconductor layers 410 and 420, which changes the population of the conduction band in the n-type semiconductor material and the population of holes in the valence band of the p-type semiconductor material. Changing the populations in this manner changes the index of refraction for light 430 having energy less than the band gap energy of the bilayer 400 without introducing optical absorption at these wavelengths.

In one embodiment, the n-type material of layer 410 is lightly doped while the p-type material of layer 420 is heavily doped. For this doping distribution, the depletion region resides mainly in the n-type material. Any changes to electrical bias predominantly change the index of refraction of the n-type material. In another embodiment, the p-type material of layer 420 is light doped while the n-type material of layer 410 is heavily doped. For this doping distribution, the depletion region resides mainly in the p-type material and changes to electrical bias predominantly change the index of refraction of the p-type material.

Figure 5:
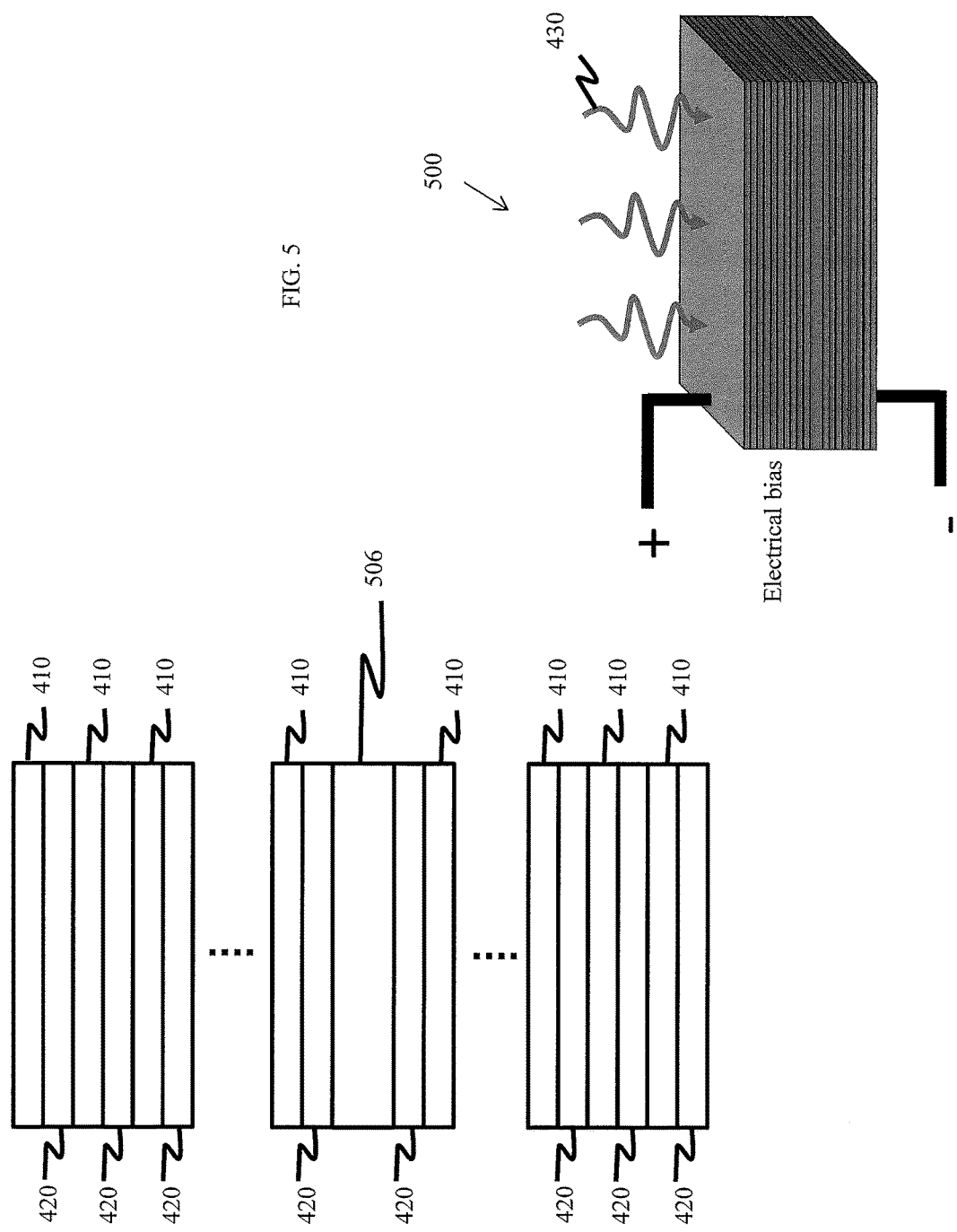
FIG. 5 shows a filter including a plurality of bilayers stacked vertically suitable for use as a programmable filter in one embodiment.

FIG. 5 shows a filter 500 including a plurality of bilayers 400 stacked vertically suitable for use as a programmable filter in one embodiment. A perspective view and a side view are shown. The filter 500 includes a central layer 506 with a plurality of bilayers stacked above the central layer 506 and a plurality of bilayers stacked below the central layer 506. For the illustrative filter 500, the plurality of bilayers is 50 bilayers. However any number of bilayers can be used in different embodiments. Each bilayer includes layers 410 and 420 as described with respect to FIG. 4. The central layer 506 is selected to have an optical thickness equal to ½ of the vacuum wavelength of the light that is to be rejected. All other layers 410 and 420 are selected to have an optical thickness equal to ¼ of the vacuum wavelength of the light to be rejected. For illustrative purposes, the passband wavelength is selected to be 1550 nm. The materials that compose the layers 410, 420 and 506 of filter 500 may be alloys of Aluminum Gallium Arsenide ($Al_xGa_{1-x}As$.) Table 1 shows the indices of refraction for these alloys in a mid-gap region of the optical spectrum.

TABLE 1

Index of refraction of $Al_xGa_{1-x}As$ as
$n = 3.3 - 0.53x + 0.09x^2$

| X | N |
|---|---|
| 0 | 3.3 |
| 0.1 | 3.2479 |
| 0.2 | 3.1976 |
| 0.3 | 3.1491 |
| 0.4 | 3.1024 |

The index of refraction of a material is in general a complex value composed of a real part n, referred to as the index of refraction, and an imaginary part k, referred to as the optical absorption coefficient. Low absorption materials have very low values of "k." For the materials used herein, the optical loss is extremely low in this region of the spectrum, with "k" values of zero or substantially zero.

In an illustrative example of filter 500, semiconductor layers 410 and central layer 506 are composed of n-type $Al_xGa_{1-x}As$, with x=0.0, (i.e., n-type GaAs). The thickness of the semiconductor layer 410 is 117.42 nm and its index of refraction is 3.30. The thickness of the central layer 506 is twice the thickness of the semiconductor layer 410. Semiconductor layer 420 is composed of p-type $Al_xGa_{1-x}As$, with x=0.3 (i.e., $Al_{0.3}Ga_{0.7}As$), with a thickness of 123.45 nm and an index of refraction of 3.1491. Using Eq. (1), the optical thickness of semiconductor layer 410 is given by:

Optical thickess$_{410}$=$n_{410}$ thickness$_{410}$=387.5 nm  Eq. (2)

The optical thickness of layer 420 is given by:

Optical thickess$_{420}$=$n_{420}$ thickness$_{420}$=387.5 nm  Eq. (3)

These thicknesses are equal to ¼ of the light wavelength of 1550 nm. The optical thickness of central layer 506 is given by:

Optical thickess$_{506}$=$n_{506}$ thickess$_{506}$=775.0 nm  Eq. (4)

Figure 6:
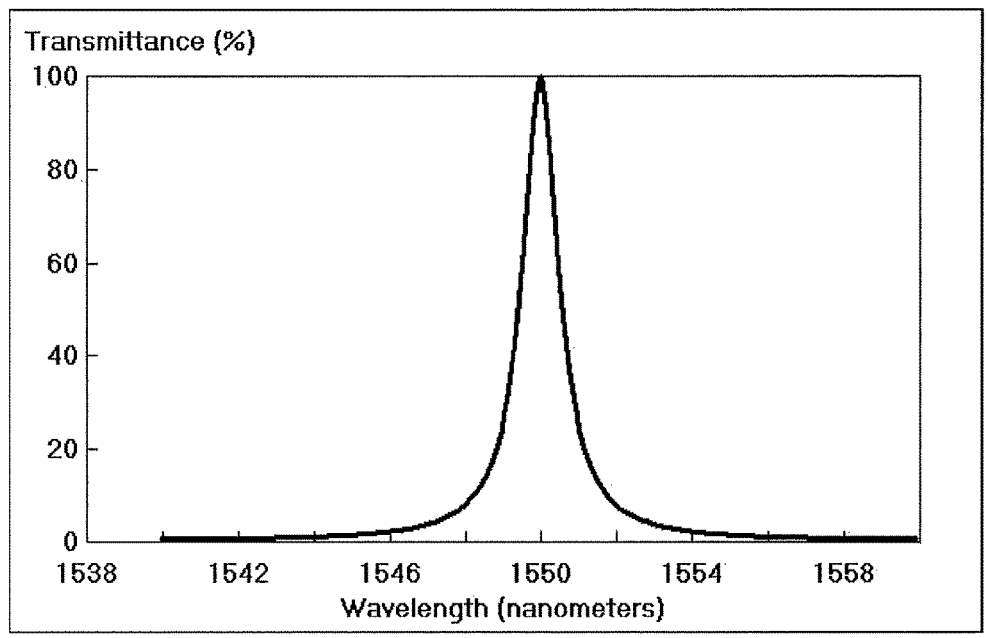
FIG. 6 shows the optical transmission spectrum of a filter composed of 100 bilayers in an unbiased state.
Figure 7:
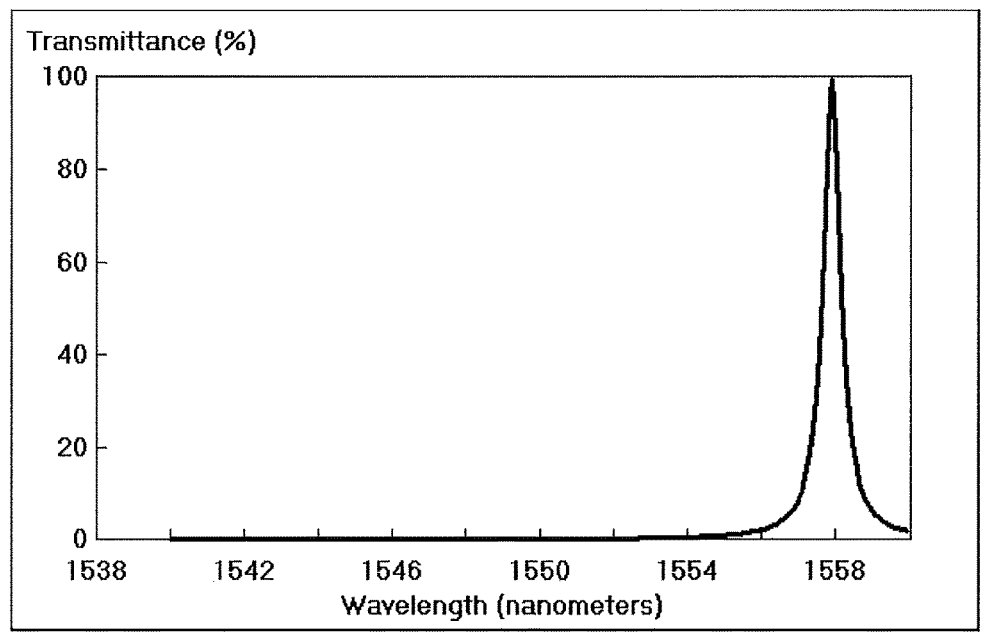
FIG. 7 shows the optical transmission spectrum of filter 500 with an electrical bias selected to increase an index of refraction of selected layers of the filter by 1% of their unbiased values.

The performance of filter 500 under various biases is illustrated with respect to FIGS. 6 and 7.

FIG. 6 shows the optical transmission spectrum of filter 500 composed of 100 bilayers in an unbiased state. The passband wavelength is located at 1550 nm. FIG. 7 shows the optical transmission spectrum of the filter 500 with an electrical bias selected to increase the index of refraction of layers 410 and central layer 506 by 1% of their unbiased values. The passband wavelength is shifted to 1557.9 nm, which is equivalent to a 0.5% shift in the unbiased passband wavelength.

Figure 8:
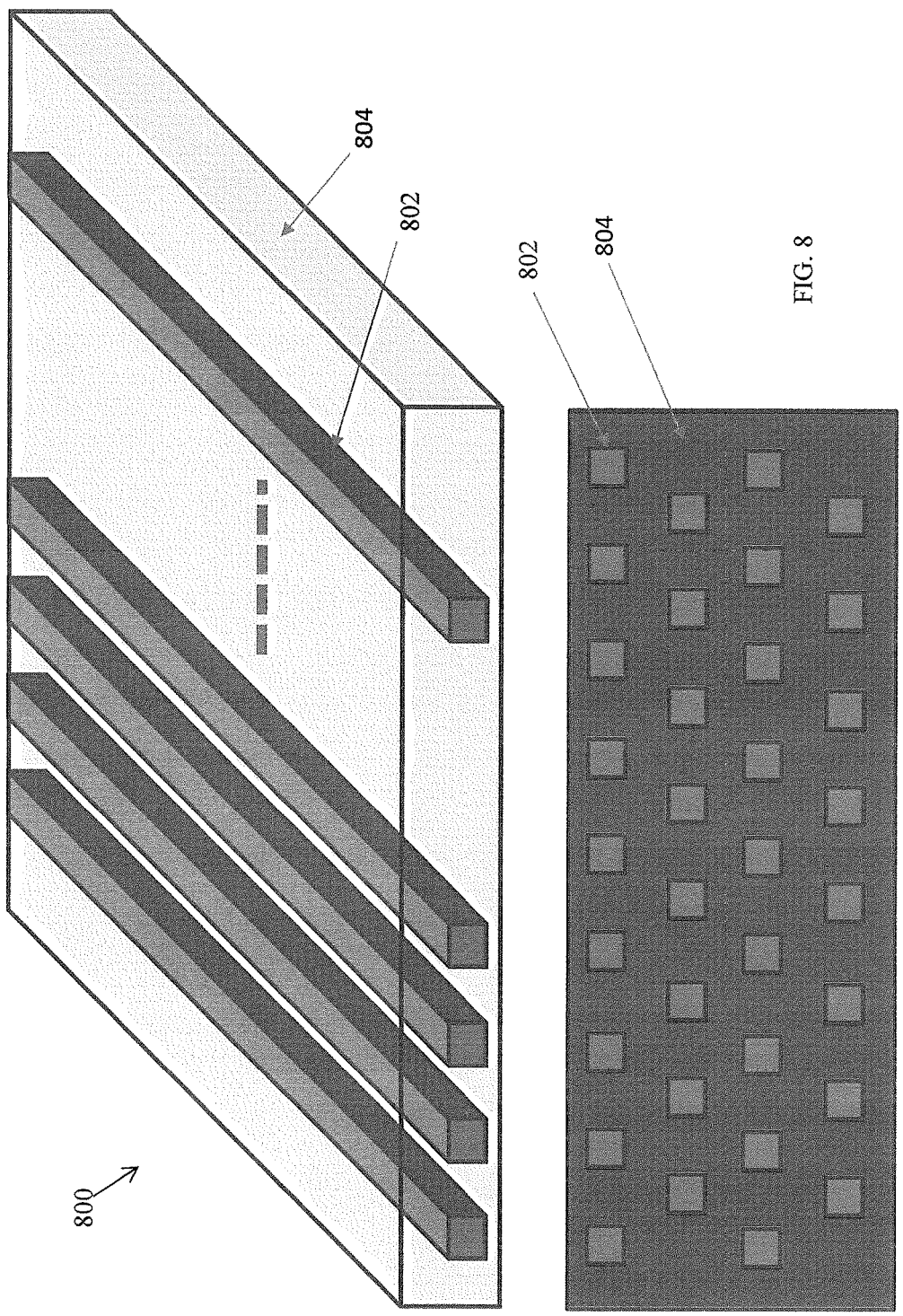
FIG. 8 shows a perspective view and side view of photonic crystal suitable for use as a programmable filter in one embodiment of the invention.

FIG. 8 shows a perspective view and side view of a photonic crystal 800 suitable for use as a programmable filter 110 in one embodiment of the invention. The photonic crystal 800 includes alternating rows of n-type semiconducting bars 802 embedded in a matrix 804 of p-type material to form a lattice structure. The bars 802 can be in the form of a rectangular cuboid elongated along one dimension. The index of refraction of the bars 802 is different from the index of refraction of the matrix 804. The bars 802 are spaced so that the spacing between bars 802 is shorter that the passband wavelength of the fixed filter 108. Electrical contact is made between the bars 802 and the matrix 804 resulting in an array of p-n diodes. Reverse bias of the array of p-n diodes modulates the index of refraction of the bars 802 and a small region in the matrix 804 surrounding the bars 802. The modulation of the index of refraction and the changing depletion width between the bars 802 and the matrix 804 alter the bandgap of the photonic crystal 800. Modulating the optical bandgap of the photonic crystal 800 frustrates a band stopping operation of the photonic crystal 800. The result is a tuning of the wavelength-rejecting property of the photonic crystal 800 and a transmission of light through the photonic crystal 800. When combined with a fixed filter 108, the overall result is the ability to program either passage or blockage of light transmission through the system.

The photonic crystal 800 may be designed in order provide passage of the passband wavelength of the fixed filter 108 when there is zero electrical bias. When an electrical bias is applied to the photonic crystal 800, the optical bandgap of the photonic crystal 800 is moved to be centered on the passband wavelength of the fixed filter 108, thereby providing an overall blockage of light passing through the combination of the photonic crystal 800 and the fixed filter 108.

Since the shutter (106, FIG. 1) is continuously tunable by adjusting the voltage bias, it is possible to use the shutter as a variable attenuator. If the unwanted light source is just above the damage threshold of the sensor then the filter can be tuned slightly off of the passband so as to attenuate but not eliminate the offending signal intensity. This allows the sensor to continue operation with reduced overall sensitivity to the desired source signal.

Figure 9:
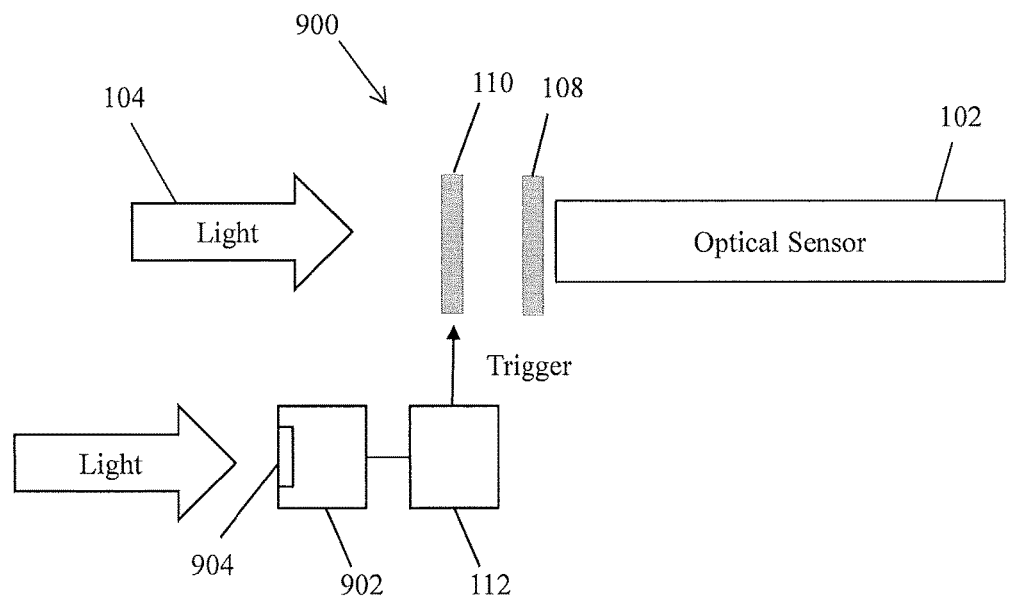
FIG. 9 shows a control system for an optical sensor according to one embodiment.

FIG. 9 shows a control system 900 for an optical sensor 102 according to one embodiment. The fixed filter 108 and programmable filter 110 are placed in front of an aperture of the optical sensor 102. Light is received at the programmable filter 110. Light is also received at a control device 902. The control device 902 may include a full-field sensor 904 that senses light entering the optical aperture over a large area. The full-field sensor 904 may be less susceptible to burnout than the optical sensor 102. A signal generated by light entering the sensor of the control device 902 is indicative of an intensity of the light 104 received at the control device 902. The intensity of light received at sensor 904 can be compared to a threshold intensity value. When the received light intensity exceeds the threshold intensity value, the control device 902 sends a signal to the voltage source 112 to provide a voltage bias that shifts the central wavelength of the programmable filter 110 away from the central wavelength of the fixed filter 108, thereby preventing light from entering the optical sensor 102. When the received light intensity is less than the threshold intensity value, the control device 902 controls the voltage source 112 to provide a voltage bias (i.e., zero voltage) that aligns the central wavelength of the programmable filter 110 with the central wavelength of the fixed filter 108, thereby allowing light to enter the optical sensor 102. In this manner, the control device 902 protects the optical sensor 102 from a light intensity that is capable of burning out or destroying the optical sensor 102.

Figure 10:
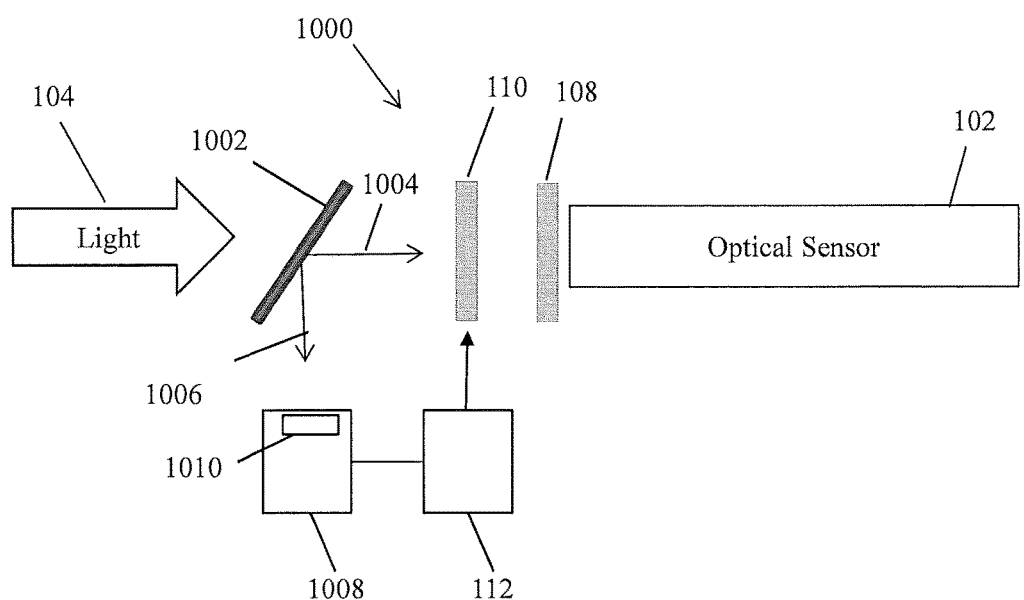
FIG. 10 shows control system for an optical sensor according to another embodiment.

FIG. 10 shows control system 1000 for an optical sensor 102 according to another embodiment. Fixed filter 108 and programmable filter 110 are placed in front of an aperture of the optical sensor 102. A beam splitter 1002 is placed in front of the programmable filter 110. Light 104 passes through the beam splitter 1002, programmable filter 110 and fixed filter 108 in order to enter the optical sensors 102. The beam splitter 1002 splits the light 104 into a first beam 1004 and a second beam 1006. The first beam 1004 continues in a direction for passing through the programmable filter 110 and fixed filter 108 to be detected at the optical sensor 102. The second beam 1006 is directed toward a control device 1008 in order to be detected at a sensor 1010 of the control device 1008. The sensor 1010 of the control device 1008 may be less sensitive than the optical sensor 102. In one embodiment, the sensitivity of the sensor 1010 is about $\frac{1}{25}^{th}$ of the sensitivity of the optical sensor 1010. Light entering the sensor 1010 generates a light intensity signal that is used at the control device 1008 to generate a control signal. The light intensity of second beam 1006 is compared to a threshold intensity value. When the light intensity at the sensor 1010 exceeds the threshold intensity value, the control device 1008 sends a signal to the voltage source 112 to provide a voltage bias that shifts the central wavelength of the programmable filter 110 away from the central wavelength of the fixed filter 108, thereby preventing light from entering the optical sensor 102. When the received light intensity at the sensor 1010 is less than the threshold intensity value, the control device 1008 controls the voltage source 112 to provide a voltage bias (i.e., zero voltage) that aligns the central wavelength of the programmable filter 110 with the central wavelength of the fixed filter 108, thereby allowing light to enter the optical sensor 102.

Figure 11:
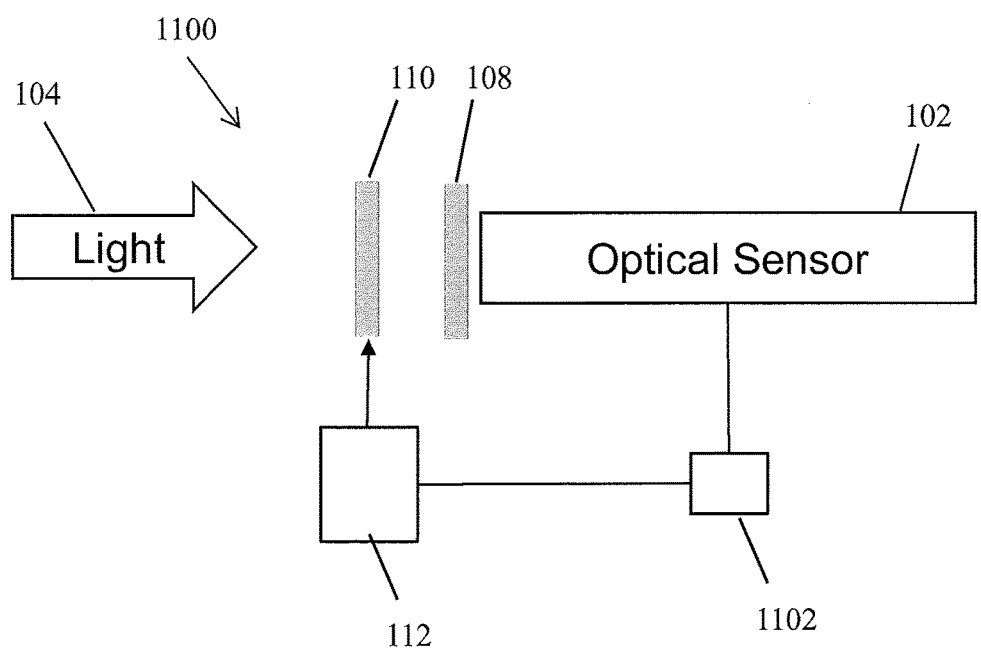
FIG. 11 shows control system for an optical according to yet another embodiment.

FIG. 11 shows control system 1100 for an optical 102 according to yet another embodiment. Fixed filter 108 and programmable filter 110 are placed in front of an aperture of the optical sensor 102. In an ON-state, the central wavelength of the programmable filter 110 is aligned with the central wavelength of the fixed filter 108. The optical sensor 102 receives the light 104. A processor 1102 receives a signal indicating the intensity of light received at the optical sensor 102. The processor 1102 compares the received light intensity to a threshold intensity value. When the received light intensity exceeds the threshold intensity value, the processor 1102 sends a signal to the voltage source 112 to provide a voltage bias that shifts the central wavelength of the programmable filter 110 away from the central wavelength of the fixed filter 108, thereby preventing light from entering the optical sensor 102. When the received light intensity is less than the threshold intensity value, the processor 1102 controls the voltage source 112 to provide a voltage bias that aligns the central wavelength of the programmable filter 110 with the central wavelength of the fixed filter 108, thereby allowing light to enter the optical sensor 102. When in the OFF-state, i.e., when the central wavelength of the programmable filter 110 is shifted away from the central wavelength of the fixed filter 108, the processor 1102 can periodically provide a signal to the voltage source 112 to re-align the central wavelength of the programmable filter 110 with the central wavelength of the fixed filter 108, thereby allowing the optical sensor 102 to test if the light intensity has returned to a level that is not harmful to the optical sensor 102. While the processor 1102 is shown in FIG. 11 as being separate from the optical sensor 102, processor 1102 can be an integrated component of the optical sensor 102 in other embodiments.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An apparatus for protecting an optical sensor, comprising:
   a fixed filter having a fixed passband for light transmission;
   a programmable filter having a variable passband for light transmission, the programmable filter including at least two quarter wavelength layers, the first quarter wavelength layer including alternating n-type layers and p-type layers of a first material and the second quarter wavelength layer including alternating n-type layers and p-type layers of a second material; and
   a controllable voltage source that shifts the passband of the programmable filter from a first state in which the passband of the programmable filter is substantially the same as the passband of the fixed filter and a second state in which the passband of the programmable filter is different than the passband of the fixed filter.

2. The apparatus of claim 1, wherein the fixed filter and programmable filter are located in front of an aperture of the sensor.

3. The apparatus of claim 1, further including a control device that controls the voltage source based on a measured intensity of light.

4. The apparatus of claim 3, wherein the control device controls the voltage source to apply the voltage bias when the measured intensity is greater than a threshold intensity value.

5. The apparatus of claim 3, wherein the control device includes a control sensor for receiving light from over a broad area.

6. The apparatus of claim 3, further comprising a beam splitter for redirecting a portion of light directed at the optical sensor toward the control device.

7. The apparatus of claim 3, wherein the control device includes the optical sensor.

8. The apparatus of claim 1, wherein the programmable filter includes at least one bilayer that includes a layer of n-type semiconducting material and a layer of p-type semiconducting material.

9. The apparatus of claim 8, wherein the programmable filter includes a half-wavelength central layer having a plurality of quarter wavelength bilayers stacked above the central layer and a plurality of quarter wavelength bilayers stacked below the central layer.

10. The apparatus of claim 1, wherein the programmable filter includes a photonic crystal.

11. A method of protecting an optical sensor, comprising:
placing a fixed filter having a fixed passband for light transmission in front of the optical sensor;
placing a programmable filter having a variable passband for light transmission in front of the fixed filter, the programmable filter including at least two quarter wavelength layers, the first quarter wavelength layer including alternating n-type layers and p-type layers of a first material and the second quarter wavelength layer including alternating n-type layers and p-type layers of a second material; and
controlling a voltage at the programmable filter to shift the variable passband of the programmable filter with respect to the fixed passband.

12. The method of claim 11, wherein the controllable voltage source places the programmable filter in one of a first state in which the passband of the programmable filter is substantially the same as the fixed passband and a second state in which the passband of the programmable filter is different than the fixed passband.

13. The method of claim 11, further including controlling the voltage source based on an intensity of light received at a control device.

14. The method of claim 13, further comprising controlling the voltage using control device that compares a received intensity level of light to an intensity threshold value.

15. The method of claim 13, further comprising redirecting a portion of light directed at the sensor toward the control device using a beam splitter.

16. The method of claim 13, controlling the programmable filter using an intensity of light received at the sensor.

17. The method of claim 11, wherein the fixed central wavelength is about 1.55 micrometers.

18. The method of claim 11, wherein the programmable filter includes at least one bilayer that includes a layer of n-type semiconducting material and a layer of p-type semiconducting material.

19. The method of claim 18, wherein the programmable filter includes a half-wavelength central layer having a plurality of quarter wavelength bilayers stacked above the central layer and a plurality of quarter wavelength bilayers stacked below the central layer.

20. The method of claim 11, wherein the programmable filter includes a photonic crystal that includes n-type semiconductor bars arranged in a p-type matrix, further comprising electrically biasing the n-type semiconductor bars to change an optical bandgap of the photonic crystal.

* * * * *